United States Patent
Cochran et al.

(10) Patent No.: US 8,964,237 B2
(45) Date of Patent: Feb. 24, 2015

(54) IMAGING DEVICE INCLUDING WEAR LEVELING FOR NON-VOLATILE MEMORY AND SECURE ERASE OF DATA

(71) Applicant: Lexmark International, Inc., Lexington, KY (US)

(72) Inventors: Howard Charles Cochran, Lexington, KY (US); Bryan Scott Willett, Lexington, KY (US); Michael James Klein, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 10 days.

(21) Appl. No.: 13/930,151

(22) Filed: Jun. 28, 2013

(65) Prior Publication Data

US 2015/0002900 A1    Jan. 1, 2015

(51) Int. Cl.
*G06K 15/00*    (2006.01)
*G06K 15/02*    (2006.01)

(52) U.S. Cl.
CPC .................................. *G06K 15/1828* (2013.01)
USPC ........................... 358/1.16; 358/1.14; 380/277

(58) Field of Classification Search
CPC ............ G06F 12/0246; G06F 12/1408; G06F 12/1466; G06F 21/00; G06F 21/60; G06F 21/608; G06F 21/62; G06F 21/6209; G06F 21/71; G06F 21/78; G06F 21/84; G06F 2211/008; G06F 2211/2107; G06F 2211/2147
USPC ......... 358/1.1, 1.13, 1.14, 1.16, 444; 380/277
See application file for complete search history.

(56) References Cited

U.S. PATENT DOCUMENTS

| | | | |
|---|---|---|---|
| 6,134,660 A | | 10/2000 | Boneh |
| 7,292,355 B2 * | | 11/2007 | Jacobsen ...................... 358/1.13 |
| 7,978,849 B2 * | | 7/2011 | Hinaga ........................... 380/45 |
| 8,250,380 B2 | | 8/2012 | Guyot |
| 8,301,908 B2 * | | 10/2012 | Masui et al. .................. 713/189 |
| 2012/0278564 A1 | | 11/2012 | Goss |

OTHER PUBLICATIONS

Jaeheung Lee, Sangho Yi, Junyoung Heo, Hyungbae Park, Sung Y. Shin, Yookun Cho; An Efficient Secure Deletion Scheme for Flash File Systems; Journal of Information Science and Engineering; Sep. 30, 2008; pp. 27-38.

Zachary N.J. Peterson, Randal Burns, Joe Herring, Adam Stubblefield, Aviel D. Rubin; Secure Deletion for a Versioning File System; FAST '05: 4th USENIX Conference on File and Storage Technologies; pp. 143-154.

* cited by examiner

*Primary Examiner* — Thomas D Lee

(57) ABSTRACT

Methods and apparatus teach wear leveling non-volatile memory and secure erasure of data. A computing device receives data to be stored. The data is encrypted, including generation of encryption/decryption key(s). The key(s) are stored in either non-volatile or volatile memory according to a plurality of classification schemes. In a first scheme, key(s) are stored in non-volatile memory and will be retained in the event of a power cycle of the computing device. Otherwise, key(s) stored in volatile memory will be lost upon a power cycle. Upon issuance of a key destruction command, key(s) in the non-volatile memory are sanitized or erased, but the underlying encrypted data need not be erased since no key(s) exist that can recover original content. These techniques limit erasure commands to the non-volatile memory which prolongs its service life. Further embodiments note techniques in imaging devices conducting imaging operations, such as printing or scanning.

20 Claims, 6 Drawing Sheets

IMAGING DEVICE INCLUDING WEAR LEVELING FOR NON-VOLATILE MEMORY AND SECURE ERASE OF DATA

FIELD OF THE INVENTION

The present invention relates to computing memory and security of stored data. Schemes for wear leveling non-volatile memory and securely erasing data typify the embodiments.

BACKGROUND

Electromechanical memory devices, such as hard disk drives (HDD), are increasingly yielding to solid state drives (SSD) and other memory devices in computing environments requiring faster speed, quieter noise, lower power, compact size and cheaper prices. Under various U.S. Federal and State government regulatory schemes, however, there exist a number of laws, rules, specifications, procedures, etc. that dictate standards for the secure destruction of data from memory regardless of type. (See, e.g., *National Institute of Standards and Technology (NIST) Special Publication* 800-88, *Guidelines for Media Sanitization*.) Not only must data be erased, it must be erased in a manner that masks previous storage states to prevent a hacker's later reconstruction of content. The procedures often call for significant numbers of erasures/overwriting to memory locations over the life of devices containing data. While electromechanical memory devices tend to durably withstand these commands over time, SSD, (E)EPROM and other flash memory devices do not fare as well. Artisans have noted significant degradation and failure in the latter after a few thousand erasure cycles. The problems range from "leaky" memory cells to failed bits to failed sectors or blocks.

Artisans have attempted to overcome these problems and prolong service lives of memory with various techniques that "level out" premature wear (known as "wear leveling"). Some of the techniques track erasure and re-write commands in devices in an attempt to disseminate commands evenly amongst all memory sectors or blocks to level out their wear. In other techniques, artisans reserve memory space that becomes used only upon the failure of non-reserve memory spaces. Checksums are often used to note the failures of blocks or sectors. Upon the failure of just a few sectors, the entire memory device often fails. Unfortunately, each of these requires sophisticated mapping and tracking of memory that complicates implementation.

What is needed is a simple, yet elegant solution to gain the inherent advantages of SSD, flash, (E)EPROM, etc. The need extends to affording the highest levels of secure destruction according to state and federal mandates, but without premature wear. Additional benefits and alternatives are also sought when devising solutions.

SUMMARY

The above-mentioned and other problems are solved by methods and apparatus that wear level non-volatile memory and securely erase data. A computing device receives data to be stored. The data is encrypted, including generation of encryption/decryption key(s). The key(s) are stored in either non-volatile or volatile memory according to a plurality of classification schemes. In the event of a power cycle, keys in volatile memory are lost while those in non-volatile memory are retained. Upon issuance of a key destruction command, the key(s) in non-volatile memory are sanitized or erased, but the underlying encrypted data need not be erased since there is no longer any key to reconstruct the content of the data. The technique limits erasure commands to the non-volatile memory thereby prolonging its service life.

Further embodiments note techniques in imaging devices for data in imaging jobs. A controller classifies the data as needing to persist or not over a power cycle of the imaging device. Jobs requiring persistence have key(s) stored in non-volatile memory, such as embedded Multi-Media Card (eMMC) storage devices, otherwise the key(s) are stored in volatile memory, such as dynamic Random Access Memory (DRAM). Schemes to place files of encrypted data in memory correspond to files extensions from applications sending imaging jobs to the controller. The designations of temporary, permanent or job file extensions at the application programming interface (API) indicate requirements of data to persist or not beyond the power cycle of the imaging device. Two or more top-level directory schemes have the data stored in files/folders according to their persistence or not. Upon a destruction command regarding the key(s), files stored under the temporary file extension have their keys sanitized by promptly writing zeros to memory locations of the key(s). As back-up, sanitization occurs upon a boot up sequence after a power cycle of a computing device. Otherwise, the key(s) for permanent files or job files are promptly destroyed upon issuance of an appropriate sanitize command according to a type of storage medium housing the key(s), including contemplation of erasure commands set forth by manufacturers of the storage medium. Files and folders may be also removed.

These and other embodiments are set forth in the description below. Their advantages and features will become readily apparent to skilled artisans. The claims set forth particular limitations.

DETAILED DESCRIPTION OF THE ILLUSTRATED EMBODIMENTS

In the following detailed description, reference is made to the accompanying drawings where like numerals represent like details. The embodiments are described in sufficient detail to enable those skilled in the art to practice the invention. It is to be understood that other embodiments may be utilized and that changes may be made without departing from the scope of the invention. The following detailed description, therefore, is not to be taken in a limiting sense and the scope of the invention is defined only by the appended claims and their equivalents. In accordance with the features of the invention, methods and apparatus teach wear leveling of non-volatile memories and secure erasure of data.

Figure 1:
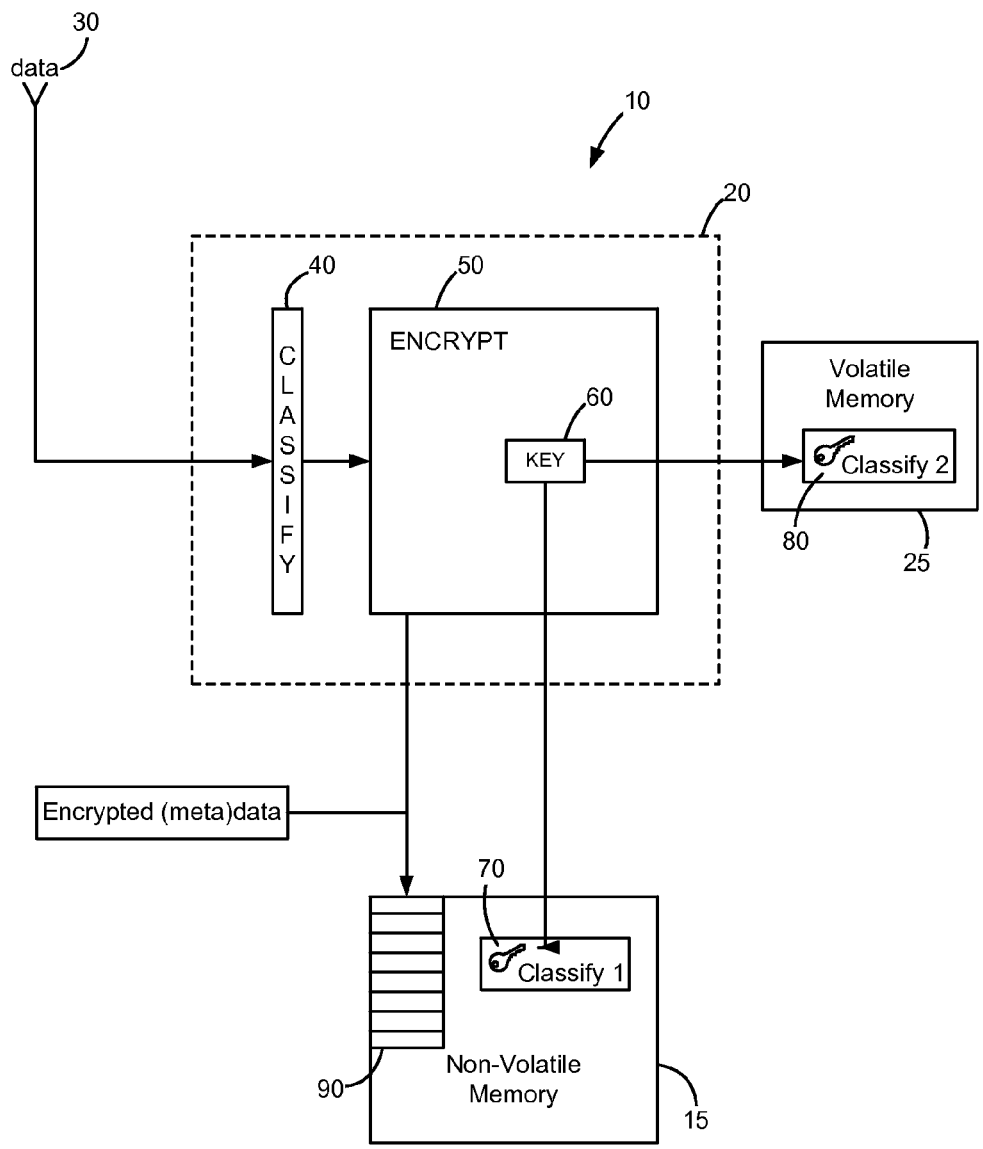
FIG. 1 is a diagrammatic view of a computing environment for wear leveling non-volatile memory and securely erasing data.

With reference to FIG. 1, a computing environment 10 includes a controller 20 in a computing device. The computing device has access to both non-volatile 15 and volatile memory 25. The memory is either internal or external to the computing device having the controller. The memories are also singular memory devices or collections of memory that combine together to represent an entirety of the non-volatile or volatile memory made available to the controller during use. The types of memory are any of a variety, but the following are anticipated: (1) volatile—, e.g., random access memory (RAM), dynamic RAM (DRAM), synchronous RAM (SRAM), etc.; and (2) non-volatile—, e.g., read only memory (ROM), programmable ROM (PROM), erasable PROM (EPROM), electrically erasable PROM (EEPROM), non-volatile RAM (NVRAM), flash memory, solid state drives (SSD), embedded Multi-Media Card (eMMC), etc. or mechanical devices, such as magnetic tapes, HDDs, optical drives, etc.

Figure 6:
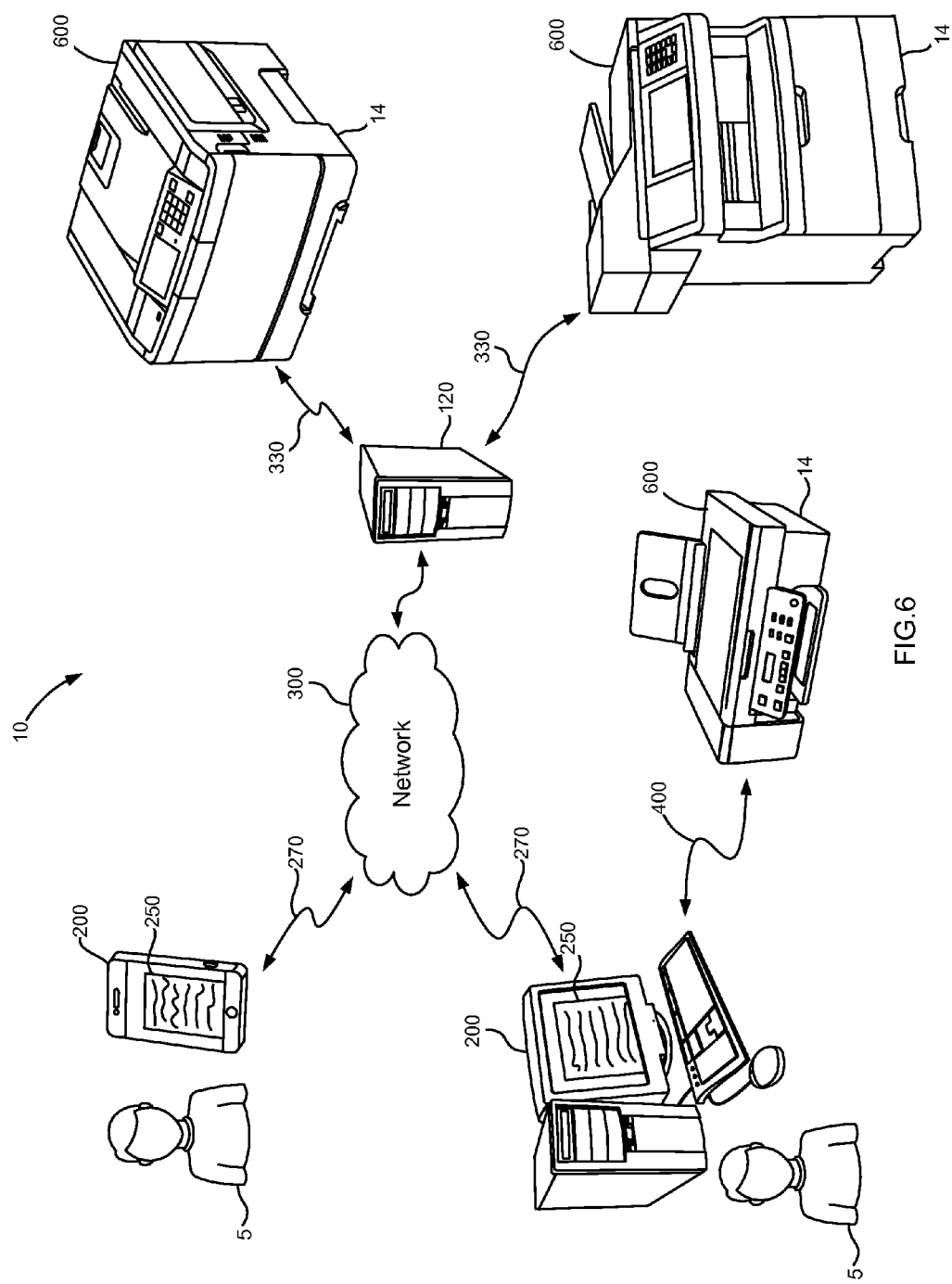
FIGS. 6-7 are diagrammatic views of an imaging device environment for wear leveling non-volatile memory and securely erasing data.

The controller 20 receives data 30 during the course of operation. The data is any of a variety and the controller receives it externally or internally. Forms of data typify streams of bits/bytes that the controller uses to cause an action. In an imaging device 600, FIG. 6, for example, the data received by the controller is an "imaging job." It comes from users 5 interacting on computing devices 200, such as smart phones, laptops, desktops, tablets, etc. As users display and engage items 250 on their computing devices, such as documents, images, web pages, screen shots, messages, files, photos, etc., they request imaging of the devices 600, such as printing, scanning, copying, faxing, etc. Users make the requests by sending the "imaging job" direct 400 to a connected imaging device or indirect 270 by way of a print server 120 and attendant computing network 300. The imaging job includes description for controllers in the various devices to speak to one another in a same page description language, such as Printer Command Language (PCL) or Postscript and skilled artisans are familiar with their content. In any language, the server forwards 330 the imaging job to a specific imaging device so users can claim a hard copy output at any of a variety of imaging devices (printers, copiers, fax machines, all-in-ones, multi-function printers (MFPs), etc.) of their choosing. The network includes or not a variety of software to send and receive packets of information between computing devices and physical hardware to move the packets, such as routers, servers, switches, desktop/laptop computers, phone transmission towers, relay towers, satellites, fiber optics, phone lines, cables, etc. The connections are wired and wireless between a few or many such devices in an internet, intranet or other environment.

Upon receipt of the data, the controller 20 classifies it at 40 according to a predetermined identification scheme. (Representative schemes will be given below.) It then encrypts the data at 50, including the generation of one or more (encryption/decryption) keys 60. The controller then directs storage of the keys according to their classification scheme. In one instance, key 70 is stored in non-volatile memory 15 per a first classification scheme of the data, while key 80 is stored in volatile memory 25 per a second classification scheme of the data. Meanwhile, the encrypted data 90 is stored in a memory location of choice—in this instance it resides in the same non-volatile memory as key 70. It fills blocks or sectors of memory according to well known techniques.

Figure 2:
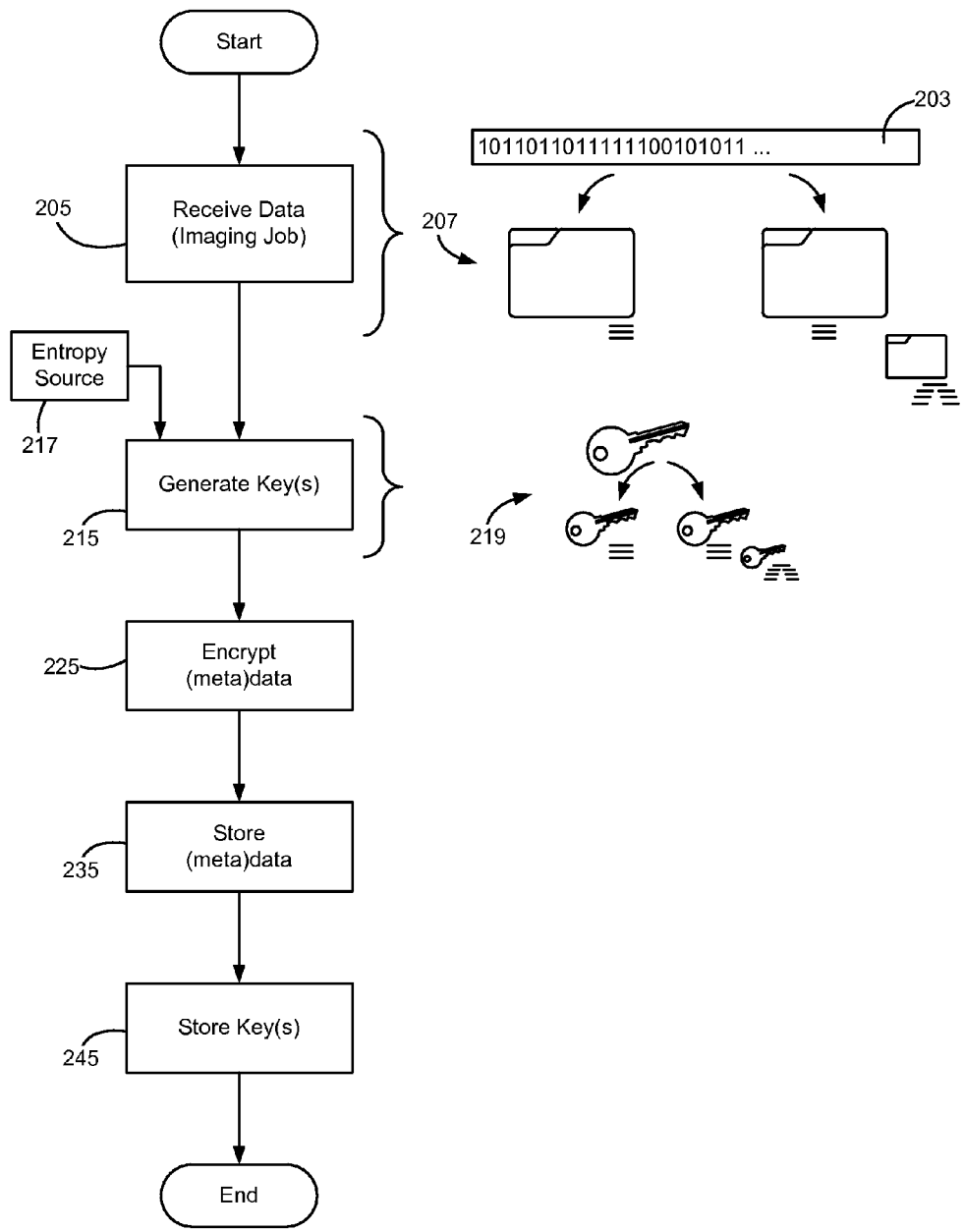
FIGS. 2-4B are flow charts for wear leveling non-volatile memory and securely erasing data.

With more specificity, controllers of imaging devices receive their data 203 in the form of an imaging job (205), FIG. 2. Relevant files and folders 207 are created for storing the data. Relevant encryption/decryption key(s) are also generated at 215, including accessing sources of entropy 217, as is known, and assembling a hierarchy of keys 219 corresponding to the hierarchy of the data as it gets assigned to appropriate folders. The key(s) are used to encrypt the underlying data of the imaging job, including encrypting metadata as is necessary (225). (The keys are any of a variety, and techniques for their generation are known to artisans, as well as their actual encryption/decryption of the underlying data 30.) The data and metadata are stored in memory at 235, including storage in volatile or non-volatile memory of the system's choice. The key(s) are also stored in either the volatile or non-volatile memory according to commands of the controller of the imaging device (245).

Figure 3:
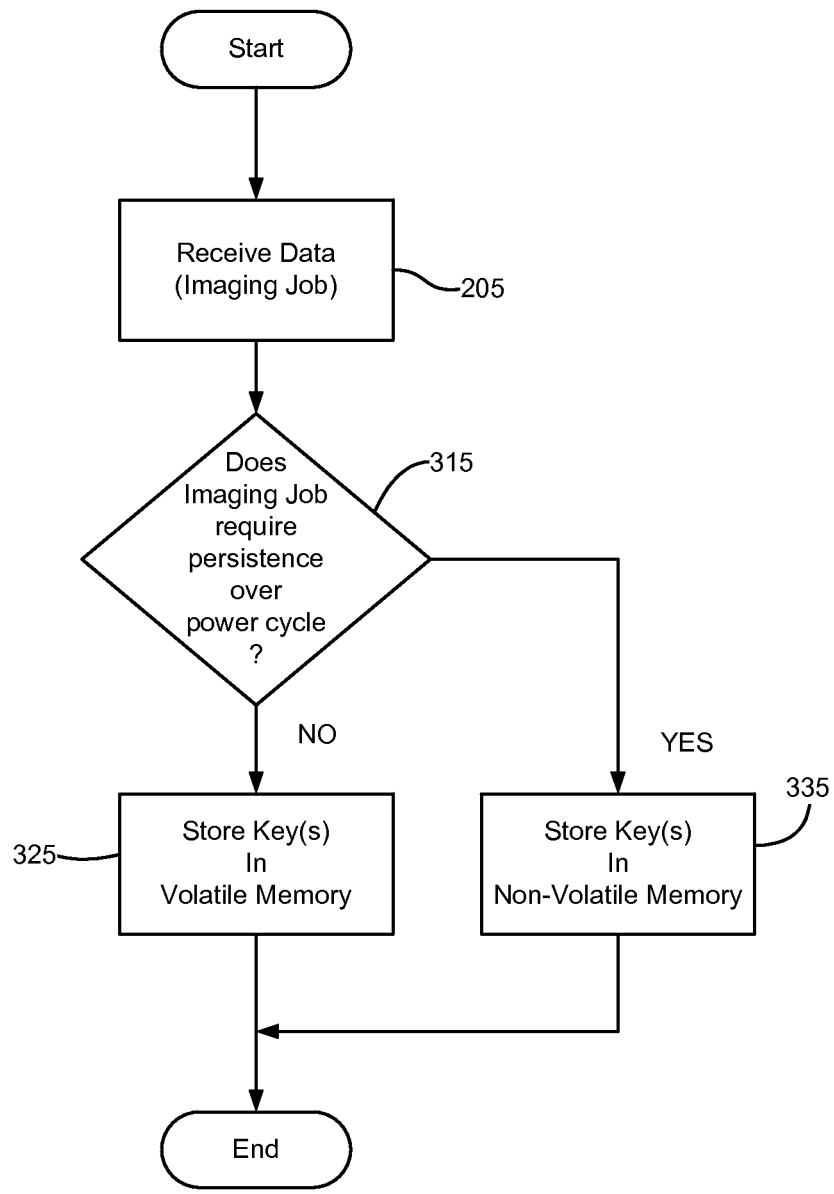

With reference to FIG. 3, if the imaging job (data, files, folders, etc.) requires persistence over a power cycle of the imaging device, the data is so classified (315). On the other hand, if the imaging job does not require persistence over the power cycle, the data is classified alternatively. In such a situation, the encryption keys are either stored in volatile or non-volatile memory, as the case may be. In this way, imaging jobs requiring persistence over the power cycle of the imaging device are stored in a non-volatile memory (325) to avoid being lost during times of power outage or cycling. Otherwise, those imaging jobs not needing such persistence are stored in volatile memory (335) and can be lost or left unrecovered during a power cycle. Ultimately, those imaging jobs having data that is deemed important for one reason or another is made to persist over time. Its key is also made to persist by being stored in a location that allows recovery in the event a power cycle occurs.

Figure 4A:
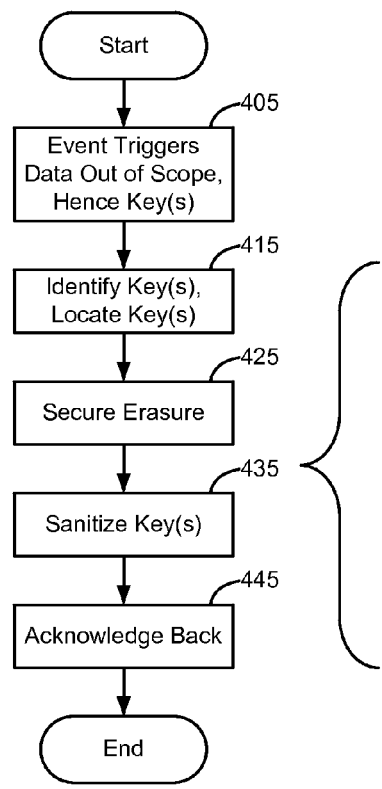
Figure 4B:
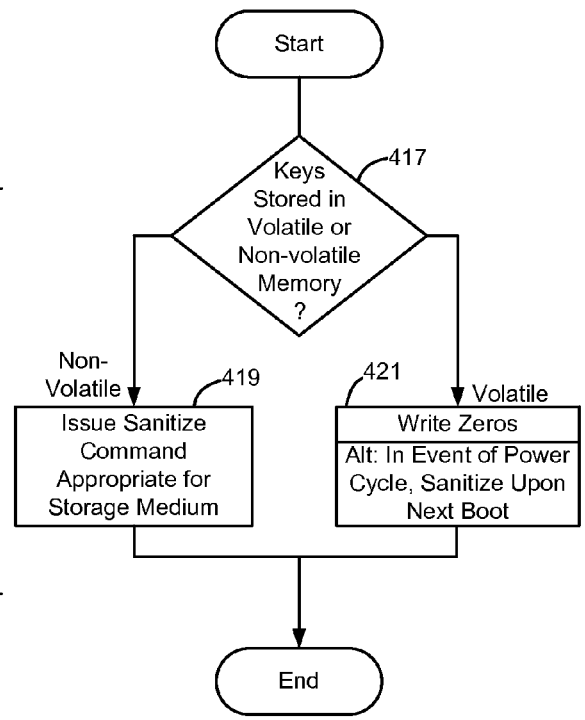

With reference to FIG. 4A, a trigger event eventually occurs that renders obsolete or "out of scope" the data of the imaging job. Events such as paper exiting a paper tray of an imaging device during printing, a user canceling an imaging job, a server releasing data of an imaging job, etc., are typical of these types of triggers. In turn, any and all key(s) associated with the data are also rendered out of scope (405) and their identities are required to be made known to the controller for eventual erasure as well as the controller learning their precise location in storage (415). Then, upon the call for the secure erasure of data (425), the controller commands the now identified/located key(s) to become sanitized (435). In FIG. 4B, the process occurs differently for key(s) stored in volatile or non-volatile memory. At decision 417, an inquiry is made as to the location of the stored key(s). If they are stored in non-volatile memory, the controller issues a sanitize command that is appropriate for the type of storage medium in which the relevant key(s) are located (419). The command is also often a function of the preferred guidelines or instructions for erasure issued by a manufacturer of the storage medium. In an EEPROM, for example, an appropriate sanitize command is typically the writing of zeros to appropriate memory locations that represent the location of the key(s). In an eMMC device, on the other hand, an appropriate command is more complex and may include the issuance of a Secure Trim command sequence, or the Trim command sequence followed by a Sanitize_Start command. (The options here relate to two different command sequences that can be used to sanitize a range of write blocks for eMMC: the original Secure Trim sequence was replaced in a later version of the eMMC specification by a newer Sanitize_Start command, which sanitizes any blocks that had previously had a normal Erase or Trim command applied to them. Devices are only required to support one or the other of these command sequences, but many of them actually implement both sets of commands.) In any type of non-volatile memory, erasure sanitizes the key(s) and the underlying data having been encrypted by the key(s) is unable to be later reconstructed by hackers or other third parties. A secure wipe of the data can be said to have occurred that meets the secure erasure standards of NIST, for example. However, since the underlying encrypted data need not be erased or sanitized, per se, unnecessary "erase," "re-write," etc. commands to the non-volatile memory do not occur and premature wear of the non-volatile memory is avoided. The wear of the memory can be described as having been "leveled out."

Figure 5:
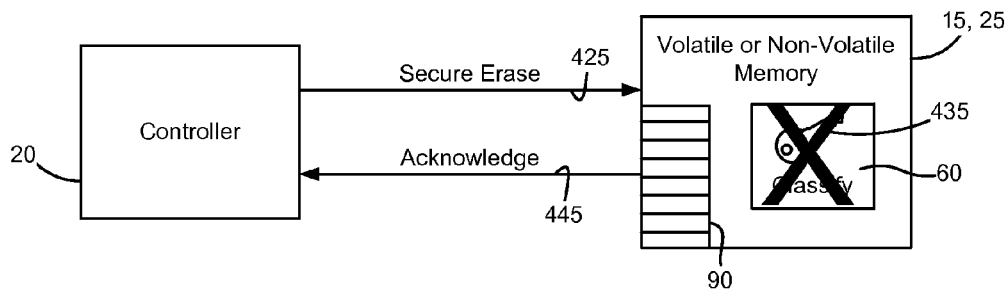
FIG. 5 is a diagrammatic view of a computing environment for sanitizing keys.

On the other hand at decision 417, if the key is stored in volatile memory, the controller causes sanitizing of the key(s) by promptly writing zeros to the memory locations storing the key(s) (421). Appreciating that a power cycle may have occurred in the imaging device, an alternate back-up plan for sanitizing the key(s) includes the controller ridding the relevant key(s) upon a next power cycle of the imaging device (421). During boot up of the imaging device after a power failure, for example, the controller causes erasure of the key(s), such as by writing zeros to relevant memory locations. Again, the underlying data need not be sanitized, as it is encrypted and stored, but unable to be re-constructed without its keys. With reference to FIG. 5, the relevant memory 15, 25 acknowledges back to the controller 20 that sanitization has occurred (445) upon the destruction of the key 60.

Figure 7:
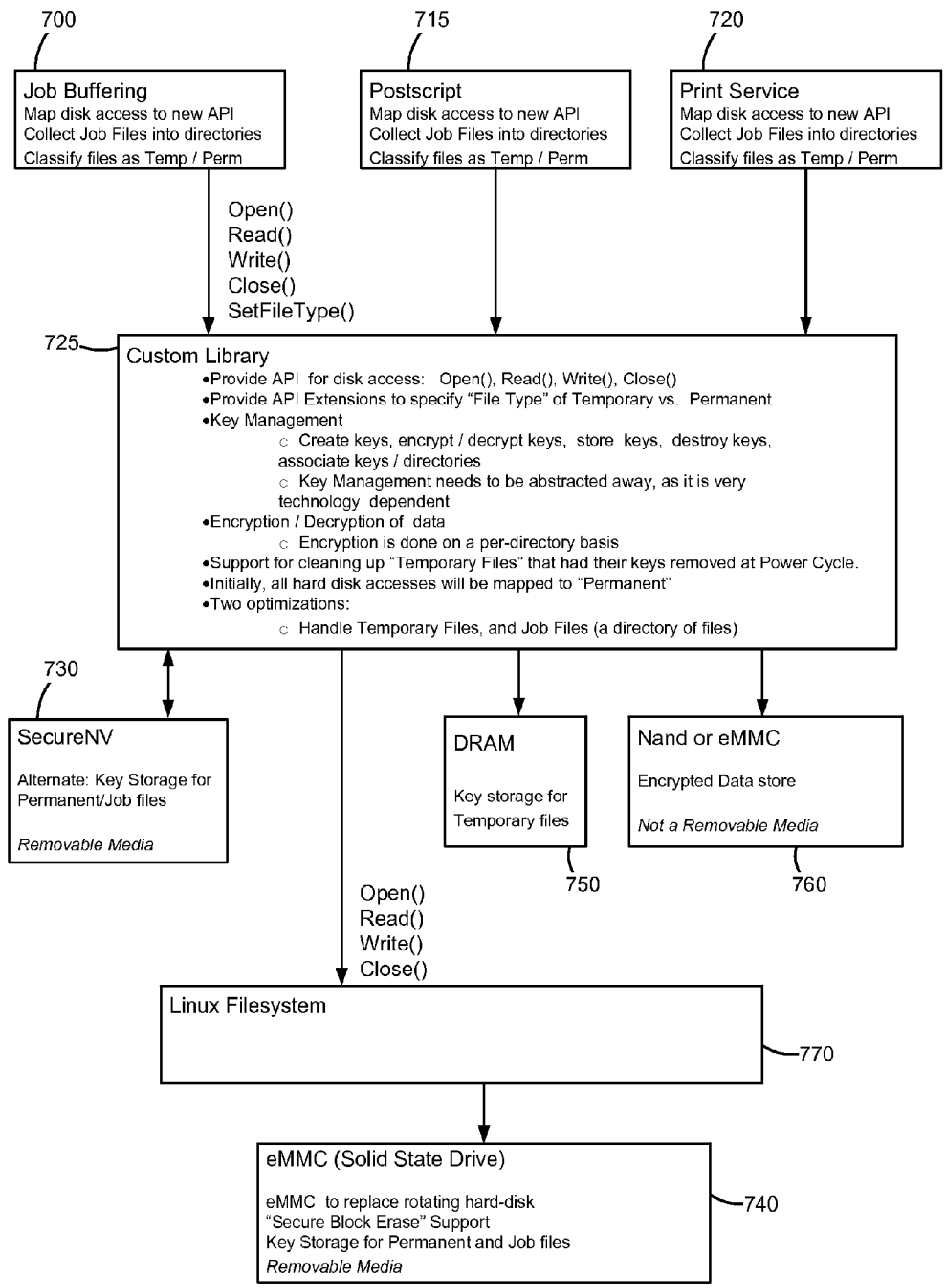

In an imaging device, a representative way to know whether files need to be stored in volatile or non-volatile memory is a by product of an Application Programming Interface (API), whereby applications creating the imaging job append file extensions to the data of the imaging jobs. With reference to FIG. 7, job buffering 710, postscript 715, print service 720, etc., are examples of applications that assign file extensions to data. A custom library at 725 provides the API to the applications making this possible. The extensions are any of a variety, but those named permanent (perm) files, temporary (temp) files, and job files are used in an imaging device 600 to denote a plurality of classification schemes. The file extensions are configured to cause the controller to store the encrypted data of the imaging job in one of two directory schemes in memory according to whether the imaging job needs to persist or not over the power cycle of the imaging device.

The permanent files are files of the imaging job that the imaging device needs to preserve over a power cycle of the imaging device. The files are created and stored individually. These files have one key per file, and each key is stored on a non-volatile memory device available to the controller. It is preferred to be stored in the SSD 740 or another non-volatile memory 730. Each time a file is created a corresponding key is stored, and each time a file is erased, a key is securely destroyed. Temporary files are also individual files, but they need not be preserved across a power cycle. These Temporary files are written to the SSD device 740, and each of these files has one key per file. However, since temporary files do not need to be preserved across power cycle, the keys are stored in DRAM 750 rather than the SSD device storing the encrypted data. The Job files are still other files that the imaging device needs for processing imaging jobs, in general, and need to be available to the controller over power cycles of the imaging device. They are a collection of files that are all related to a single job. These files are all related, and they can all be securely erased together. Hence, one cryptographic key is created to encrypt all job files related to a particular job. When the job is finished printing (or scanning), for example, and all of the files have been erased, the cryptographic key is finally destroyed to render inaccessible the underlying user data of the imaging job. Encrypted data is stored at 760, in an eMMC or NAND SSD device. (A Linux file system 770 or other may be used to interface between the custom library and the SSD 740 to provide file organization, for example.)

Relative advantages of the many embodiments should now be apparent to those skilled in the art. They include but are not limited to: (1) meeting secure erase standards of NIST and other regulatory agencies by destroying encryption/decryption keys, thereby preventing reconstruction of encrypted data; (2) minimizing erasure commands to non-volatile memory thereby prolonging service life and ameliorating memory wear as only key(s) require sanitizing, but not underlying stored data; (3) quickly protecting data of users as secure erasure only involves destruction of key(s) and not an entire destruction of the contents of data in files which are relatively enormous compared to the size of the key(s); (4) advancing the state of software beyond cryptographic erase algorithms that regularly erase data in memory, but otherwise cannot be effectively utilized with SSD devices where excessive erasing burns out memory blocks, and eventually entire devices; and (5) implementing secure erasure on various memory devices, including HDDs and other electromechanical devices.

The foregoing illustrates various aspects of the invention. It is not intended to be exhaustive. Rather, it is chosen to provide the best illustration of the principles of the invention and its practical application to enable one of ordinary skill in the art to utilize the invention. All modifications and variations are contemplated within the scope of the invention as determined by the appended claims. Relatively apparent modifications include combining one or more features of various embodiments with features of other embodiments.

The invention claimed is:

1. A method for wear leveling non-volatile memory and securely erasing data in an imaging device having volatile and non-volatile memory, comprising:
   receiving for processing an imaging job having data to be stored;
   identifying whether the imaging job needs to persist or not over a power cycle of the imaging device;
   encrypting the data, including generating one or more keys;
   storing the encrypted data in a memory of choice; and
   storing the one or more keys in non-volatile memory if the imaging job has been identified as needing to persist over the power cycle of the imaging device, otherwise storing the one or more keys in volatile memory.

2. The method of claim 1, further including sanitizing the stored one or more keys.

3. The method of claim 2, further including writing zeros to all memory locations storing the stored one or more keys.

4. The method of claim 2, wherein the sanitizing further includes issuing a sanitize command according to a type of storage medium storing the key(s).

5. The method of claim 4, wherein the sanitize command is a function of a manufacturer of the storage medium.

6. The method of claim 1, further including storing the encrypted data in said non-volatile memory.

7. The method of claim 1, further including creating files to store the data of the print job.

8. The method of claim 7, further including removing all the files upon destruction of the one or more keys stored in the volatile memory.

9. The method of claim 1, further including receiving a secure erasure command for destroying the one or more keys.

10. The method of claim 9, further including leaving the encrypted data in the memory of choice upon destroying the one or more keys.

11. An imaging device, comprising:
    a volatile memory;
    a non-volatile memory; and
    a controller to receive imaging jobs having data to be stored in memory, the controller including configuration to identify whether the imaging job requires persistence over a power cycle of the imaging device and to encrypt data in the imaging job, including generating one or more keys, wherein the controller is further configured to store the one or more keys in the non-volatile memory if the imaging job has been identified as needing to persist over the power off cycle of the imaging device, otherwise the controller is configured to store the one or more keys in the volatile memory.

12. The imaging device of claim 11, wherein the non-volatile memory is an eMMC storage device.

13. The imaging device of claim 11, wherein the volatile memory is a DRAM.

14. The imaging device of claim 11, wherein the non-volatile memory is a hard disk drive.

15. The imaging device of claim 11, further including more than one non-volatile memory.

16. The imaging device of claim 15, wherein the controller is configured to store the encrypted data in a second non-volatile memory different than said non-volatile memory storing the one or more keys.

17. The imaging device of claim 11, further including an application programming interface wherein applications creating the imaging job have file extensions to classify the imaging job according to whether the imaging job is required to persist over the power cycle of the imaging device.

18. The imaging device of claim 17, wherein the files extensions are configured to cause the controller to store the encrypted data in one of two directory schemes in memory according to whether the imaging job needs to persist or not over the power cycle of the imaging device.

19. In an imaging device having volatile memory and more than one non-volatile memory, a method for prolonging the service life of the non-volatile memories and securely erasing stored data, comprising:
    receiving an imaging job to be stored;
    classifying the imaging job, including determining whether data in the imaging job requires persistence over a power cycle of the computing device;
    encrypting the data for storage, including generating one or more keys;
    storing the encrypted data in a first of the non-volatile memories; and
    storing the one or more keys in a second of the non-volatile memories if the data requires persistence over the power cycle of the computing device, otherwise storing the one or more keys in the volatile memory.

20. The method of claim 19, further including sanitizing the stored one or more keys but not sanitizing the stored encrypted data in the first of the non-volatile memories.

* * * * *